B. H. WILLIAMS.

Revolving Fire-Arms.

No. 6,569. Reissued Aug. 3, 1875.

*Witnesses:*
Henry Eichling.
B. S. Clark.

*Inventor*
Benjamin H. Williams

N. PETERS, PHOTO-LITHOGRAPHER, WASHINGTON, D. C.

UNITED STATES PATENT OFFICE

BENJAMIN H. WILLIAMS, OF NEW YORK, N. Y.

IMPROVEMENT IN REVOLVING FIRE-ARMS.

Specification forming part of Letters Patent No. 150,120, dated April 21, 1874; reissue No 6,569, dated August 3, 1875; application filed July 3, 1875.

*To all whom it may concern:*

Be it known that I, BENJAMIN H. WILLIAMS, of the city and county of New York, in the State of New York, have invented an Improved Cartridge-Extractor for Revolving Fire-Arms; and I do hereby declare that the following is a full and exact description thereof, reference being had to the accompanying drawings and to the letters of reference marked thereon.

My invention relates to the cartridge-extractor of a many-chambered revolver fire-arm; and consists in a true circular disk, ring, or projection concentric with the axis of the revolving cylinder, connected to the recoil-shield or frame of the arm concentric to the axis of the revolving cylinder, constructed and arranged to engage, at any and all points of its periphery, with the flanged head of the cartridge-case in the cylinder, and withdraw them from their chamber in the cylinder when the cylinder is moved away from the recoil-shield, this form and action obviating the necessity of rotating adjustment between the cylinder and the extractor.

To enable those skilled in the art to make and use my invention, I will proceed to more fully describe the construction and operation of my improved cartridge-extractor, referring by letters to the accompanying drawings, in which—

Figure 1:
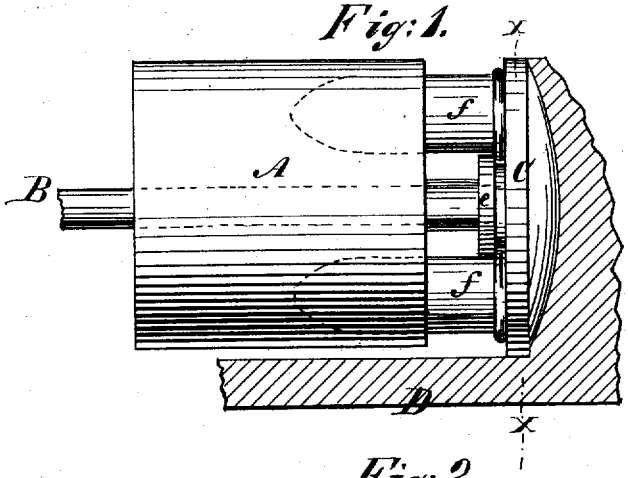
Figure 2:
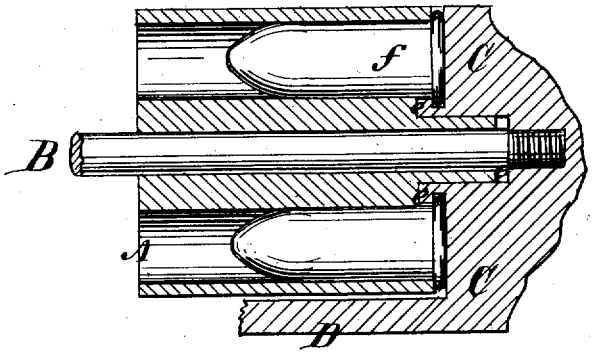
Figure 3:
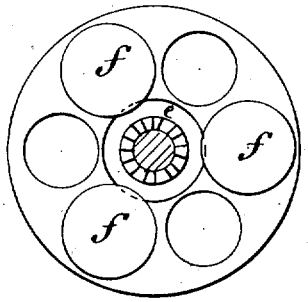

Figure 1 is a partial side view or elevation of a repeating-pistol embracing my invention. Fig. 2 is a longitudinal central section of the same, and Fig. 3 is a back view of the cylinder detached.

At Fig. 1 I have illustrated the parts as they would appear while the cylinder was being drawn off of the base-pin, and the cartridge-shells being extracted.

In the several figures the same part will be found designated by the same letter of reference.

A is the many-chambered revolving cylinder; B, the base-pin or spindle on which the cylinder rotates, and C the recoil-shield or rear portion of the frame D of the pistol. This portion C is formed or provided, at *e*, with a projecting collar or short tube, in the outer circumference or periphery of which is turned out an annular groove or channel, as shown, close to the forward face of the shield-plate C, and so as to form a shoulder, past which project (toward the base-pin B, as illustrated) the flanges of the cartridge cases or shells *f*. The shoulder named forms, in substance, a ring surrounding the projecting extractor *e*, and constitutes a ring-like extractor, all parts of the periphery of which are equally distant from the axial line of the revolving cylinder A, and therefore all points, indifferently, of such periphery will engage with the flanged heads of the shells in said cylinder, thus obviating the necessity of any adjustment of the cylinder to the extractor. In the rear end of the cylinder A is cut or turned out an annular recess or groove, *b*, (see Fig. 3,) which, it will be observed, is concentric with the central hole of said cylinder, and with its series of cartridge-chambers, and into this recess *b* fits the extractor *e* of the recoil-shield piece C, in the manner clearly shown at Fig. 2.

From this construction and combination of parts it follows that when the cylinder A is in place, and its chambers filled or loaded with cartridges *f*, the flanges of the latter will, at a point nearest the base-pin or center of rotation of said cylinder, project inwardly past or in rear of the extractor *e* of the plate C, and into the channel or groove formed in extractor *e*. This groove being a very little wider than the flanges of the cartridges *f* are thick, the part of said flanges which projects into said channel can move round freely therein without hinderance or friction whenever the cylinder A is rotated on the base-pin B; but whenever the cylinder is pulled off of the base-pin or moved longitudinally thereon, as illustrated at Fig. 1, the said projecting portions of the flanges of the cartridges will hang in said channel or catch, and hold on against the shoulder or rear edge of the extractor *e*, and be detained rearward while the cylinder is being moved forward, and thus the cartridge-shells *f* will be effectually extracted or withdrawn from the chambers of the cylinder A whenever the latter is moved longitudinally forward on the base-pin B.

It will be seen that as the extractor *e* corresponds in external size and shape to the groove *b*, and takes bearings upon both the larger and smaller circumferences of said grooves, the walls of the chambers of the cylinder are not practically weakened by the presence of the said groove *b*, said groove being always blocked up with the extractor *e* at the time when the chambers are being discharged of their contents. It will also be seen that, since the extractor *e*, by which the extraction of the empty shells is effected whenever the cylinder is moved forward on the base-pin, is larger in external diameter than the circle in which lie the innermost points of the series of cartridge-flanges, its efficiency as an extractor is infallible, because none of the flanges of the cartridges can possibly ride over or fail to be caught upon the shoulder or catching portion of said collar.

It is of course immaterial what size or diameter be adopted for said collar and groove, and whether the collar *e* be made, as shown, with a channel in its periphery to accommodate the portions of the flanges nearest to the base-pin, or be made to surround the flanges of the cartridges, and with a channel in its internal surface to accommodate those portions of the flanges most distant from the axis of motion of the cylinder.

I have represented the extractor as being formed on or out of the stock of the plate C; but this detail of construction or manufacture may, of course, be varied like others, and, if deemed expedient, said collar may be made of a separate piece and secured in place either to or on said plate C or the base-pin of the pistol.

Having so fully described my invention that any one skilled can make and use it, what I claim as new, and desire to secure by Letters Patent, is—

A revolver fire-arm with a many-chambered breech-loading cylinder provided with a cartridge-extractor connected to the recoil-shield or frame of the arm, and consisting of a disk or ring, the periphery of which, that engages the heads of the cartridge-shells in the cylinder to withdraw them therefrom, is a true circle, concentric to the axis of the cylinder, all constructed and arranged to operate as and for the purpose described.

In testimony whereof I have hereunto set my hand this 1st day of July, 1875.

BENJAMIN H. WILLIAMS.

In presence of—

B. S. CLARK,

HENRY EICHLING.